United States Patent [19]
Quigg

[11] Patent Number: 5,478,149
[45] Date of Patent: Dec. 26, 1995

[54] MAGNETIC MIXER

[75] Inventor: Daniel F. Quigg, Ventura, Calif.

[73] Assignee: Magnetic Mixers, Inc., Ventura, Calif.

[21] Appl. No.: 431,258

[22] Filed: Apr. 24, 1995

[51] Int. Cl.⁶ .................................................... B01F 13/08
[52] U.S. Cl. ............................................ 366/273; 366/314
[58] Field of Search .................................... 366/262, 263, 366/264, 265, 273, 274, 314; 416/3

[56] References Cited

U.S. PATENT DOCUMENTS

| | | | |
|---|---|---|---|
| 2,495,895 | 1/1950 | Hervert. | |
| 2,810,556 | 10/1957 | Zozulin. | |
| 2,892,620 | 6/1959 | Johnston. | |
| 3,734,119 | 5/1973 | Nudds | 137/92 |
| 4,209,259 | 6/1980 | Rains et al. | 366/273 |
| 4,653,519 | 3/1987 | Kanner | 134/140 |
| 4,993,841 | 2/1991 | Lofgren et al. | 366/274 |
| 5,061,079 | 10/1991 | Shiobara | 366/127 |
| 5,393,142 | 2/1995 | Meier | 366/274 |
| 5,407,272 | 4/1995 | Meier | 366/274 |

FOREIGN PATENT DOCUMENTS

| | | | |
|---|---|---|---|
| 360767 | 3/1990 | European Pat. Off. | 366/273 |
| 399971 | 9/1990 | European Pat. Off. | 366/273 |
| 3039810 | 5/1982 | Germany | 366/273 |
| 63-36824 | 2/1988 | Japan | 366/273 |
| 64-56127 | 3/1989 | Japan | 366/273 |
| 1130722 | 5/1989 | Japan | 366/273 |

Primary Examiner—David Scherbel
Assistant Examiner—Charles E. Cooley
Attorney, Agent, or Firm—Christie, Parker & Hale

[57] ABSTRACT

An improved magnetic mixer includes an agitator that includes a plurality of agitator magnets. A bearing arrangement allows the agitator to be magnetically levitated along the outer surface of a cylindrical vessel fitting located within a mixing vessel. The same magnetic force that is used to levitate the mixer drives the agitator. The magnetic force is preferably generated by a plurality of magnets which rotate within an aperture extending into the vessel fitting. By magnetically levitating the agitator, there is no thrust generated by the agitator against the vessel fitting which eliminates the need for thrust bearings and reduces the overall frictional forces. The low friction results in reduced particle generation, reduced power consumption and reduced maintenance compared to conventional magnetic mixers.

21 Claims, 6 Drawing Sheets

MAGNETIC MIXER

BACKGROUND OF THE INVENTION

The present invention relates to a mixer for use in agitating fluid in a pressure vessel. In particular, it relates to a magnetically driven mixer that eliminates the need for a seal around a mechanical drive shaft as is required for a mechanical mixer.

The use of magnetically driven mixers is known in the art. Magnetically driven mixers generally employ a rotating magnetic field located external to a mixing vessel, and a rotating agitator within the vessel that is coupled to the magnetic driver by one or more magnets located on, or embedded within the body of the agitator. Because such an agitator is magnetically coupled to its driver rather than being mechanically coupled, a sanitary environment can be maintained within the vessel without the need for packed or mechanical seals, such as would be required around a drive shaft that would penetrate the vessel if a mechanically coupled agitator were used. By eliminating such seals, leakage into or out of the vessel due to the agitator linkage can be eliminated.

Furthermore, with growing environmental concerns and stricter environmental regulations, magnetic mixers are gaining importance in the chemical industry in general. By eliminating the packed or mechanical seals associated with the mixer of an agitated vessel, fugitive emissions are eliminated as well as the possibility of releasing harmful or noxious fumes due to a seal failure.

Generally, in the prior art magnetically driven mixers, the agitator is held against a bearing surface by the same magnetic force that is used to drive the agitator. By its nature, such a system generates a thrust force against the bearing surface which can lead to increased friction as well as the generation of particles within the fluid being mixed due to the friction between the bearing surfaces. In many, if not most applications, the generation of particles is undesirable. Therefore, any reduction in the frictional forces between the associated bearing surfaces or other parts that contact one another is highly desirable.

SUMMARY OF THE INVENTION

A novel magnetically driven agitator is provided in which the agitator is magnetically levitated within the mixing vessel. By levitating the agitator within the vessel, the need for thrust bearings is eliminated. By eliminating such bearings and the friction associated with them, the generation of undesirable particles is greatly reduced. Moreover the reduction of friction provides reduced wear on the bearing surfaces, lower power consumption for the driver, and reduced maintenance for the entire mixing system.

The novel system is also easy to assemble and disassemble, further reducing maintenance costs. Furthermore, due to its novel design, the mixer can be cleaned without disassembling the various parts. Moreover, the use of the magnetically levitated, magnetically driven mixer of the present invention promotes flow of the fluid to be mixed around the bearing surfaces, virtually eliminating any dead spots within the mixing vessel.

These improvements are achieved by the use of mixing vessel that includes a vessel fitting which is a cup-shaped hollow cylinder, either fabricated integral to the mixing vessel itself or welded to an existing mixing vessel. The vessel fitting protrudes into the vessel typically at the bottom, and defines an aperture into which the driver can be placed. Preferably, the driver consists of a plurality of permanent magnets mounted about a motor driven drive shaft. The drive magnets are arranged in an alternating orientation such that a given drive magnet having a particular north or south outwardly facing orientation is adjacent to drive magnets having the opposite polar orientation.

An agitator fits over the vessel fitting and includes a hollow cylindrical hub on which agitator magnets are arranged circumferentially. The magnets allow the agitator to be both driven and levitated by the drive magnets. The agitator magnets are oriented such that the agitator magnets adjacent to any given agitator magnet are oriented with opposing poles facing inward towards the rotational axis of the drive shaft. A plurality of agitator blades are fixed about the hub for providing the agitation of the fluid within the vessel once the driver engages the hub.

The magnetic forces between the driver and the agitator tend to cause the agitator to levitate and center itself along the length of the vessel fitting. While any thrust generated by the agitator and/or the weight of the agitator may cause the agitator to slightly de-center itself along the longitudinal axis of the vessel fitting, the magnetic levitation of the agitator eliminates any thrust forces and, therefore, eliminates the need for thrust bearings. Moreover, since the magnets of both the driver and the agitator hub are balanced radially, there is very little radial force generated by the rotating agitator. Theoretically, the radial forces cancel one another completely. However, due to minor variations in the magnetic attractions between the drive and agitator magnets due to manufacturing tolerances and due to the unstable equilibrium caused by the concentric magnetic fields of the driver and hub, the agitator may tend to favor one side of the vessel fitting when rotating. Therefore, bearings are useful for maintaining the agitator in a centered position and reducing friction resulting from these secondary effects.

The bearings include a pair of bearing surfaces located on the top and bottom of the agitator on either end of the agitator magnets. Preferably, the bearing surfaces are on removable bearing rings. A mating pair of bearing rings are located on the vessel fitting to cooperate with the agitator bearing surfaces and are mounted to the vessel fitting such that they can slide up and down along the vessel fitting and thereby allow the agitator to magnetically levitate along the length of the vessel fitting. The mixer assembly described above provides an extremely low friction mixer which results in low particle generation, low power consumption and a reduced maintenance schedule compared to conventional magnetic mixers.

In the preferred embodiment, the agitator also includes a plurality of radial holes extending through the hub which help to promote circulation of fluid around the bearing surfaces and into the area between the hub and the vessel fitting. By including these radial holes, any dead spots which might otherwise develop between the hub and the vessel fitting, are eliminated. Moreover, by promoting flow of fluid around the bearings, the bearings are continuously flushed, further reducing friction and providing cooling of the bearing surfaces.

The design further provides a mixer that is simple to clean. By promoting the flow of fluid around the bearing surfaces and between the hub and vessel fitting, the mixer can be effectively cleaned without the need for disassembling the agitator from the vessel fitting. When there is a need to clean the vessel, the vessel is merely drained of the fluid that has been mixed and then filled with water or some other solvent for cleaning the interior walls of the vessel and the various components of the agitator. The agitator can be driven by the driver during cleaning. Moreover, the agitator can also be steamed or autoclaved for sterilization. Because the mixing assembly is so easy to clean, a single vessel and mixer can be used for multiple applications without extensive downtime between mixing different batches of product as is generally encountered with conventional mixers.

Additional features of the invention will be described by the following description and by the accompanying figures.

DETAILED DESCRIPTION OF THE INVENTION

Figure 1:
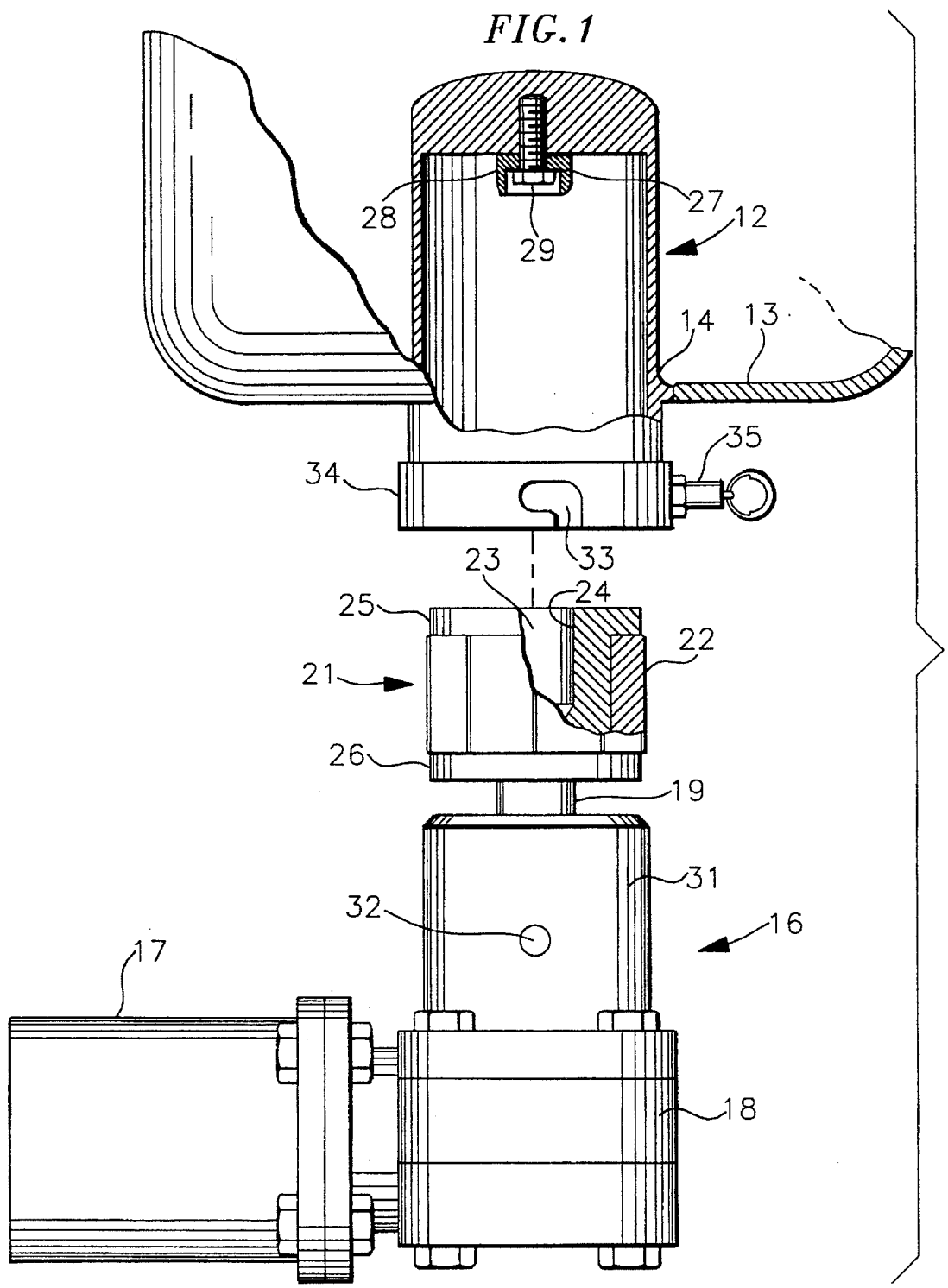
FIG. 1 illustrates in partial cutaway, an elevation view of a mixing vessel with a vessel fitting of the present invention welded in place and a driver for driving an agitator of the present invention.

Referring to FIG. 1 a vessel fitting 12 is shown attached to a mixing vessel 13. Preferably, the vessel fitting is made of a non-magnetic alloy such as stainless steel, so that it will not interfere with the magnetic field which is used to drive the agitator. The vessel fitting includes a weld flange 14 that can be used to weld the vessel fitting to an existing mixing vessel. The vessel fitting is generally a cylindrical fitting that extends into the mixing vessel and which is closed on the end innermost to the mixing vessel. The outer surface of the vessel fitting which is located inside the mixing tank, provides a surface about which the agitator can rotate as will be discussed in further detail later.

The interior of the vessel fitting provides an aperture area into which a magnetic drive assembly 16 can be inserted at least partially. The drive assembly comprises a motor 17, which is preferably a variable speed electric motor. Gear box 18 is used to reduce the speed of the motor output and redirect the motor's driving force to drive shaft 19, which is used to rotate a drive magnet housing 21. The drive magnet housing includes a plurality of drive magnets 22 that are used to supply the magnetic force for driving an agitator located within the vessel.

The drive magnet housing defines a bearing aperture 23 with inner bearing surface 24. Upper and lower magnet positioning rings 25 and 26 hold the drive magnets in place. The inner bearing surface mates with a similar outer bearing surface 27 external to a steady bearing 28 that is mounted in the uppermost inner portion of the vessel fitting by bolt 29. Once the drive magnet housing has been inserted into the vessel fitting and the motor is started, the steady bearing maintains the drive magnet housing in a central location and prevents it from wobbling within the vessel fitting.

Preferably, the drive assembly is mounted to the vessel fitting by a quick-release mechanism. This permits easy access to the drive assembly for maintenance purposes. Moreover, if for some reason the magnetic field needs to be disengaged such as for maintenance, a quick-release fitting is useful. The preferred quick release mechanism comprises a driver mount 31 with a pair of opposing bayonet pins 32 which cooperate with a pair of opposing L-shaped bayonet slots 33 on a lower flange 34 of the vessel fitting. As illustrated by the drawing figures, the drive magnetic housing can be inserted into the vessel fitting and locked in place by a slight twist of the driver mount so as to engage the bayonet pins in the bayonet slots. A spring pin 35 is useful for locking the driver mount in place once the bayonet pins have been engaged.

Figure 2:
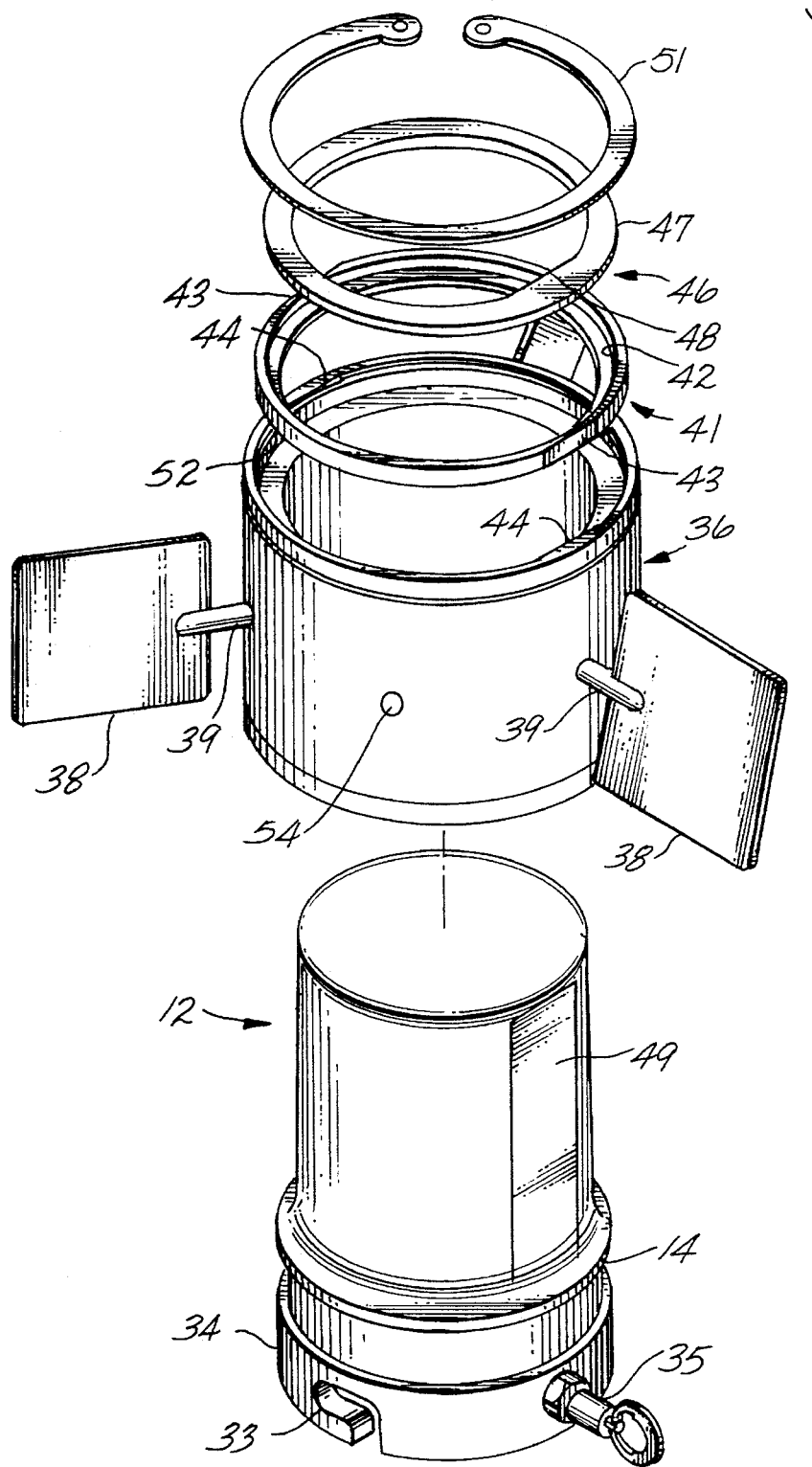
FIG. 2 is an exploded perspective view of the mixing assembly.
Figure 3:
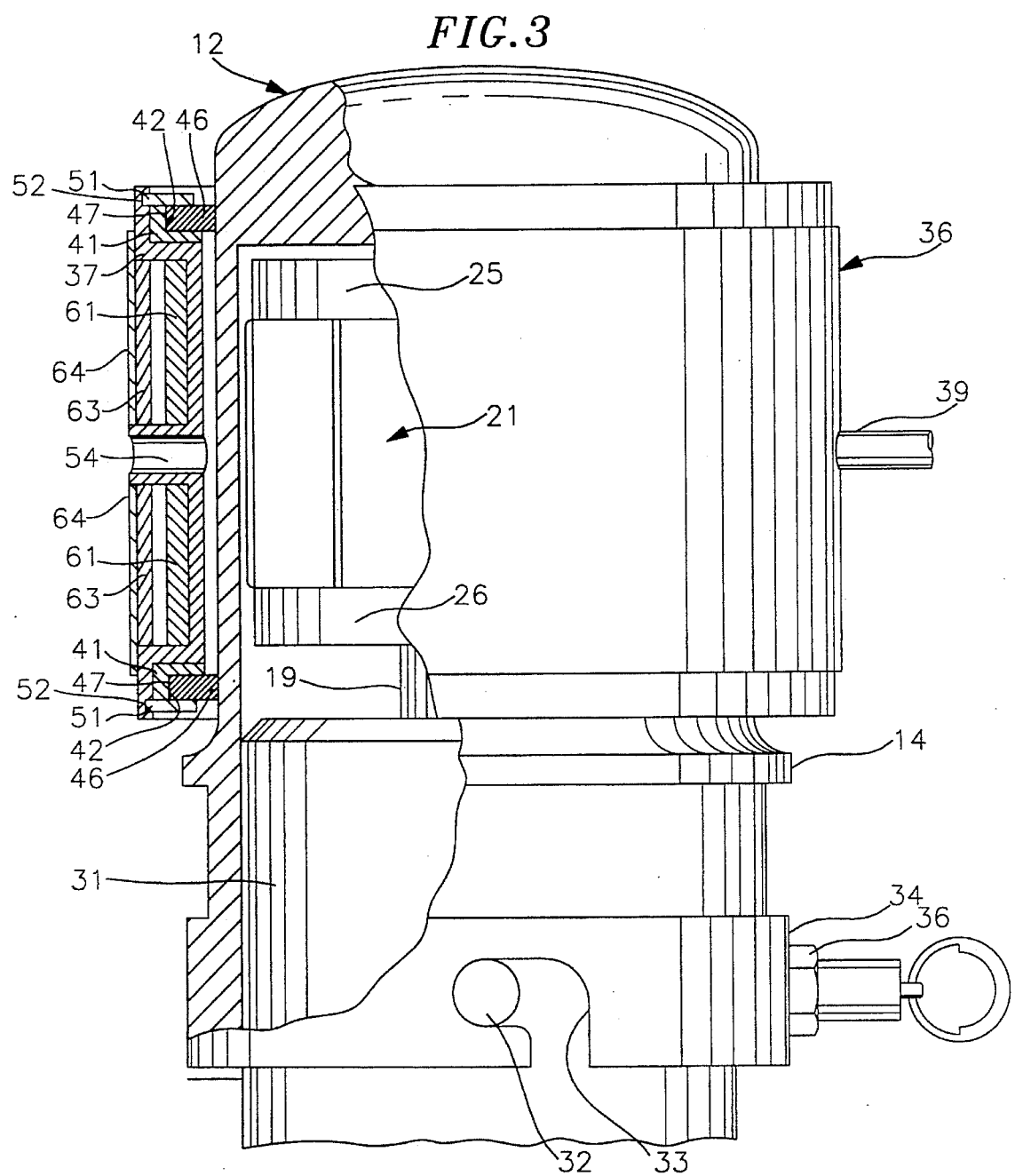
FIG. 3 is an elevation view of the mixing assembly shown partly in section.

Referring now to FIGS. 2 and 3, the agitator is illustrated in further detail. The agitator 36 comprises a hollow cylindrical agitator hub 37 and a plurality of agitator blades 38 mounted to the agitator hub by blade mounting pins 39. The agitator hub is a hollow cylinder which can be mounted over and rotated about the vessel fitting.

In order to reduce friction between the agitator and the vessel fitting, a system of bearings is used. A pair of hub mounted bearing rings 41, each having an inner bearing surface 42, are mounted at the top and bottom of the agitator hub and fixed with respect to the agitator hub. In order to prevent the hub mounted bearing rings from rotating with respect to the agitator hub a pair of opposing outer flats 43 cooperate with similar internal flats 44 on the inner surface of the agitator hub. For simplicity, only the upper bearing assembly is illustrated in FIG. 2. FIG. 3 illustrates both the upper and lower bearing assemblies.

A pair of vessel fitting bearing rings 46, each with an outer bearing surface 47, mate with the inner bearing surface of the hub mounted bearing rings. An inner flat 48 on each of the vessel fitting bearing rings cooperates with an outer flat 49 on the vessel fitting so as to prevent the vessel fitting bearing rings from rotating with respect to the vessel fitting. While the vessel fitting bearing rings are fixed against rotation with respect to the vessel fitting, they may slide up or down along the outer surface of the vessel fitting such that an agitator, as described below, can be magnetically levitated along the length of the vessel fitting by the same magnetic force generated by the drive magnets for driving the agitator. In the preferred embodiment, tungsten carbide bearing surfaces are used. A pair of C-shaped spring clips 51 engage with an inner slot 52 of the agitator hub in order to hold the bearing assemblies in place.

The agitator hub also includes a plurality of fluid circulation apertures 54 spaced radially about the circumference of the agitator hub. These apertures promote the flow of fluid outwardly from the interior of the agitator hub between the vessel fitting and the agitator so as to both help cool the bearing surfaces and prevent any build-up of materials or dead spots within the space between the vessel fitting and agitator. It should also be recognized that the bearings are assembled with enough play so that the fluid to be mixed can flow between the bearing surfaces to reduce metal-on-metal contact and provide lubrication.

Figure 4:
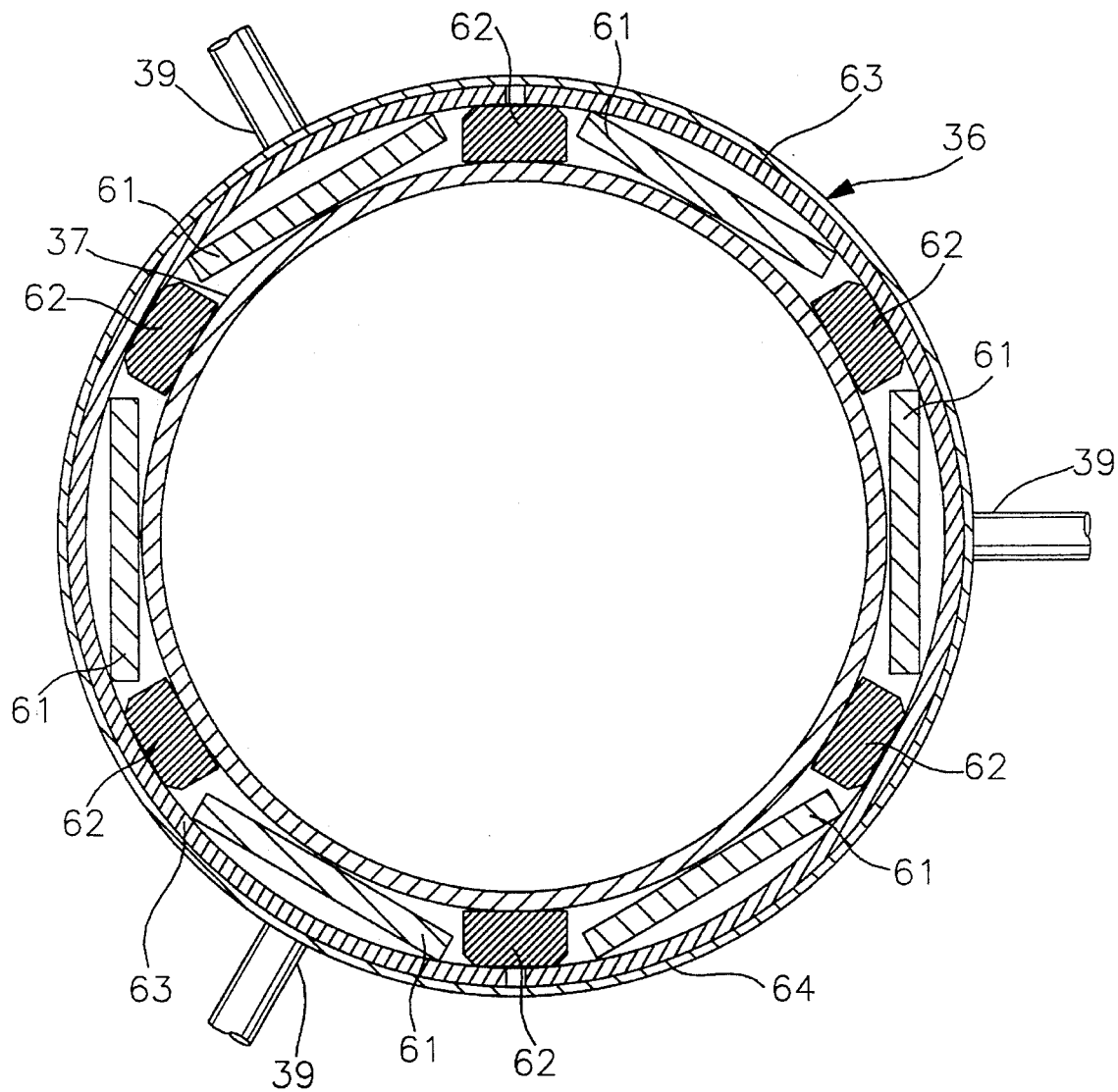
FIG. 4 is a plan view illustrating the features of the agitator.

The placement of the magnets and the structure for retaining the magnets in the agitator is best illustrated in FIGS. 3 and 4. Six pairs of agitator magnets 61 are spaced equidistantly around the circumference of the agitator hub. One magnet from each pair is placed above the center line of the agitator while the other magnet from each pair is placed below the center line forming an upper and a lower set of six magnets for each set. Six pairs of magnet spacers 62 hold adjacent magnets apart. A pair of split backing rings 63 hold the magnets and magnet spacers against the agitator hub and a pair of outer housing rings 64 hold the magnet assembly in place. One split backing ring and one outer housing ring hold the upper set of magnets in place while the other split backing ring and outer housing ring held the lower set of magnets in place. Preferably, the outer housing rings are welded in place to keep the magnets sealed from contact with the fluid to be mixed.

Figure 5:
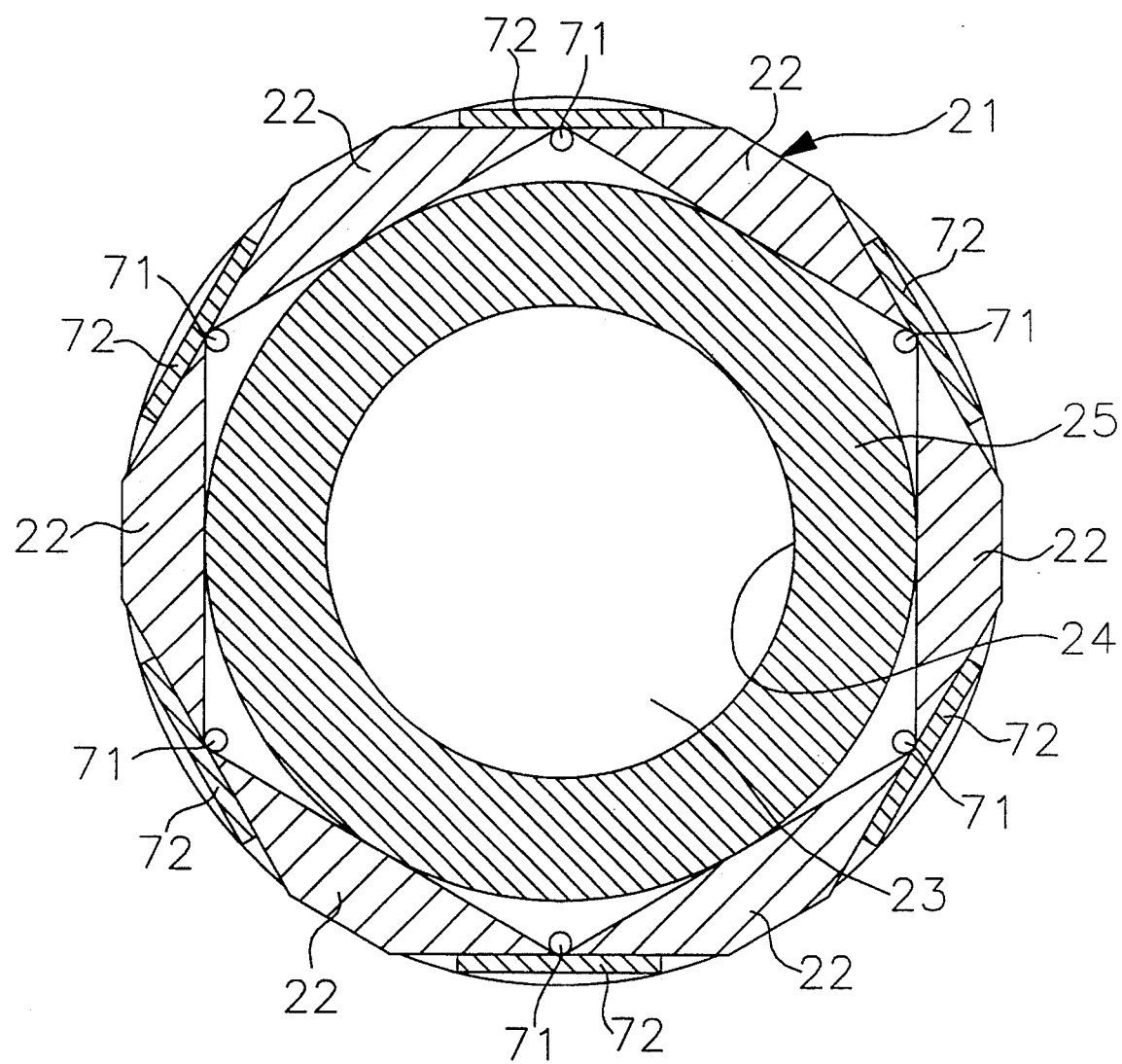
FIG. 5 is a plan view illustrating the features of the drive magnet housing.

The placement of the magnets in the drive magnet housing is best illustrated in FIG. 5. The six drive magnets are spaced from one another by magnet spacers 71 and held in place in the drive magnet housing by six drive magnet retaining plates 72.

Figure 6:
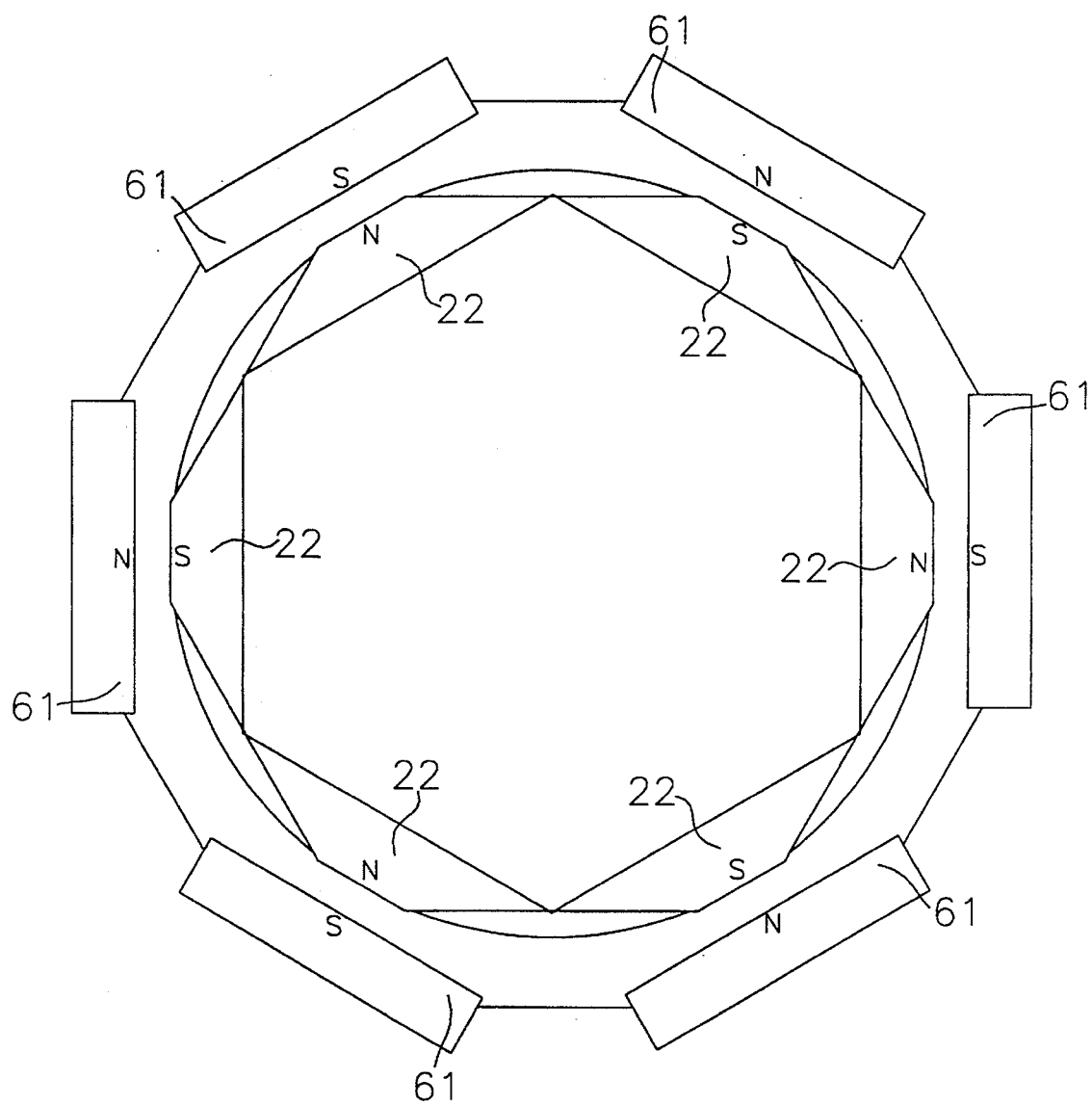
FIG. 6 is a schematic diagram illustrating the placement of and interaction between the magnets.

The specific orientation of each of the magnets is illustrated schematically in FIG. 6. Adjacent agitator magnets 61 alternate such that their north and south poles face inwardly towards the axis of rotation of the agitator. The drive magnets 22 are similarly oriented facing outwardly away from the axis of rotation with adjacent drive magnets having alternating north and south poles facing outwardly. As illustrated, the magnetic forces created by the drive magnets engage opposing poles of the agitator magnets such that the agitator is magnetically coupled to the drive magnetic housing so that when the drive magnetic housing spins, the agitator rotates within the mixing vessel.

The same magnetic force that is used to rotate the agitator is also used to levitate the agitator along the length of the vessel fitting. Because the vessel fitting bearing rings are permitted to slide up or down the vessel fitting, the agitator can also slide up and down the vessel fitting until it finds an equilibrium position. The equilibrium position is determined by the precise placement of the drive magnet housing within the vessel fitting, the weight of the agitator, and the thrust generated by the agitator when in operation. The strength of the magnetic field also prevents the agitator from flying off the top of the vessel fitting when in operation. By such a sliding bearing arrangement, any thrust generated by the agitator, either due to its weight or due to its rotation in the fluid to be mixed, is transferred through the magnetic field to the magnetic drive assembly. This eliminates the need for thrust bearings within the mixing vessel, thus reducing friction and the associated wear and power demands associated with such friction.

While the embodiment described illustrates the use of six pairs of agitator magnets and six drive magnets, different numbers of magnets can be used depending on the strength of the magnetic attraction needed. For large mixers or for mixing viscous fluids, more magnets may be needed. Preferably, the magnets are provided in even sets so that an alternating pole arrangement can be maintained.

In the preferred embodiment, rare earth magnets are used as they provide very strong attractive forces. One example of such a rare earth magnet, is a magnet made from neodymium-iron-boron. In the preferred embodiment, all wetted portions of the agitator assembly, that is those surfaces coming in contact with the fluid to be mixed, preferably are made of stainless steel or some other non-magnetic, corrosion resistant alloy. In certain applications, the wetted surfaces may be plastic rather than metal.

While the preferred embodiment described above employs a variable speed electric motor as the motive force for driving the agitator, any number of different motive forces can be used. For example, either pneumatic or hydraulic driven motors can be used for rotating the drive magnet housing. Similarly, if steam is available, then a steam turbine or other steam driver can be used as the motive force. Furthermore, while the preferred embodiment describes the use of a plurality of permanent magnets which are rotated in order to form a magnetic coupling to the agitator magnets, and thereby rotate the agitator within the mixing vessel, a fixed stator may also be used to drive the agitator magnets. In such an embodiment, a number of electromagnets located within the vessel fitting can be controlled so as to create a rotating magnetic field which can be used to drive the agitator magnets. If a starter is used, the agitator acts as a rotor.

Having described the preferred embodiment of the present invention, it is apparent that several modifications may be made while keeping within the scope of the following claims.

What is claimed is:

1. A mixer for agitating a fluid in a vessel, the mixer comprising:

a vessel fitting having inner and outer surfaces for defining a generally cylindrical member extending into the vessel and having a longitudinal axis such that the outer surface of the vessel fitting is located within the vessel;

an agitator comprising:
   a hub for fitting over the outer surface of the vessel fitting and rotatable with respect to the vessel fitting;
   a plurality of agitator magnets disposed circumferentially about the hub;
   means extending from the hub for agitating the fluid; and
   a first pair of inwardly facing bearing surfaces spaced from one another on the hub;

a pair of bearing rings having a second pair of bearing surfaces for cooperating with the first pair of bearing surfaces, the pair of bearing rings for encircling the outer surface of the vessel fitting and able to move longitudinally along a portion of the outer surface of the vessel fitting; and driving means within the vessel fitting for magnetically coacting with the plurality of agitator magnets and causing the agitator to spin about the longitudinal axis within the vessel and levitate along the outer surface of the vessel fitting.

2. The mixer of claim 1 wherein the driving means comprises a plurality of drive magnets for rotating about the longitudinal axis.

3. The mixer of claim 2 wherein the driving means further comprises a motor for rotating the drive magnets about the longitudinal axis.

4. The mixer of claim 2 further comprising an even number of agitator magnets sealed within the hub and an even number of drive magnets, wherein the agitator magnets are arranged such that adjacent agitator magnets face toward the longitudinal axis with alternating north and south poles, and the drive magnets are arranged such that adjacent drive magnets face away from the longitudinal axis with alternating north and south poles.

5. The mixer of claim 1 wherein the vessel fitting extends upwardly from a bottom wall of the vessel.

6. The mixer of claim 1 wherein the first pair of bearing surfaces is removably attached to the hub.

7. The mixer of claim 1 wherein the outer surface of the vessel fitting defines at least one longitudinal flat, and each of the bearing rings includes at least one internal flat for mating with the at least one longitudinal flat and for preventing rotation of the bearing rings about the vessel fitting.

8. The mixer of claim 1 wherein the hub includes a plurality of radial holes for promoting circulation of fluid between the hub and the vessel fitting.

9. A mixer for agitating a fluid in a vessel, the mixer comprising:

a vessel fitting having inner and outer surfaces for defining a generally cylindrical member extending into the vessel and having a longitudinal axis such that the outer surface of the vessel fitting is located within the vessel;
an agitator comprising:
  a hub for fitting over the outer surface of the vessel fitting and rotatable with respect to the vessel fitting, the hub having a top and a bottom;
  a plurality of agitator magnets sealed within and spaced circumferentially about the agitator;
  means for agitating the fluid;
  a first bearing surface located toward the top of the agitator and above the hub magnets; and
  a second bearing surface located toward the bottom of the hub and below the hub magnets;
first and second bearing rings with corresponding third and fourth bearing surfaces for cooperating with the first and second bearing surfaces, the first and second bearing rings being in longitudinal sliding engagement with a portion of the outer surface of the vessel fitting; and
a plurality of drive magnets rotatably mounted within the vessel fitting for rotating about the longitudinal axis in order to create a rotating magnetic field for engaging the plurality of agitator magnets and causing the agitator to spin about the longitudinal axis within the vessel and for magnetically levitating the agitator along the vessel fitting.

10. The mixer of claim 9 further comprising a variable speed motor for rotating the drive magnets about the longitudinal axis.

11. The mixer of claim 9 further comprising N pairs of agitator magnets and N drive magnets, N being an even integer, wherein the pairs of agitator magnets are arranged such that adjacent pairs of agitator magnets face toward the longitudinal axis with alternating north and south poles, and the drive magnets are arranged such that adjacent drive magnets face away from the longitudinal axis with alternating north and south poles.

12. The mixer of claim 11 wherein N equals 6.

13. The mixer of claim 9 wherein the first and second bearing surfaces are removably attached to the hub.

14. The mixer of claim 9 wherein the outer surface of the vessel fitting defines at least one longitudinal flat and the first and second bearing rings each include at least one internal flat for mating with the at least one longitudinal flat and for preventing rotation of the bearing rings about the vessel fitting.

15. The mixer of claim 9 wherein the hub includes a plurality of radial holes for promoting circulation of fluid between the hub and the vessel fitting.

16. A system for mixing a fluid comprising:
a vessel having a bottom wall, the bottom wall defining a hollow and generally cylindrical drive housing extending into the vessel along an imaginary rotational axis, the drive housing having inner and outer surfaces, the outer surface being within the vessel;
first and second bearing rings having corresponding first and second bearing surfaces, the bearing rings being slidably mounted within the vessel on the outer surface of the drive housing;
an agitator comprising:
  a hollow cylindrical hub for fitting over and in rotatable engagement with the outer surface of the drive housing;
  a plurality of agitator magnets spaced circumferentially about the hub;
  one or more agitator blades extending radially from the hub; and
  third and fourth bearing surfaces for engaging the first and second bearing surfaces, respectively; and
a driver within the drive housing for creating a rotating magnetic field about the rotational axis for engaging the agitator magnets and thereby rotating the agitator, and levitating the agitator along the outer surface of the drive housing.

17. The system of claim 16 wherein the driver comprises:
a plurality of drive magnets for rotating about the rotational axis; and
a motor for rotating the drive magnets about the rotational axis.

18. The system of claim 17 wherein the third and fourth bearing surfaces are removably attached to the hub.

19. The system of claim 17 wherein the agitator magnets are sealed within the hub.

20. The system of claim 17 wherein the third bearing surface is on a first side of the agitator magnets and the fourth bearing surface is on a second side of the agitator magnets opposite the first side.

21. The system of claim 17 wherein the hub includes a plurality of radial holes for promoting circulation of fluid between the hub and the drive housing.

* * * * *

UNITED STATES PATENT AND TRADEMARK OFFICE
CERTIFICATE OF CORRECTION

PATENT NO. : 5,478,149
DATED : December 26, 1995
INVENTOR(S) : Daniel F. Quigg

It is certified that error appears in the above-indentified patent and that said Letters Patent is hereby corrected as shown below:

Column 7, line 10, change "agitator and above the hub"
to -- hub above the agitator --.

Column 7, line 12, change "hub" (second occurrence)
to -- agitator --.

Signed and Sealed this

Sixth Day of August, 1996

Attest:

BRUCE LEHMAN

*Attesting Officer*     Commissioner of Patents and Trademarks